United States Patent Office.

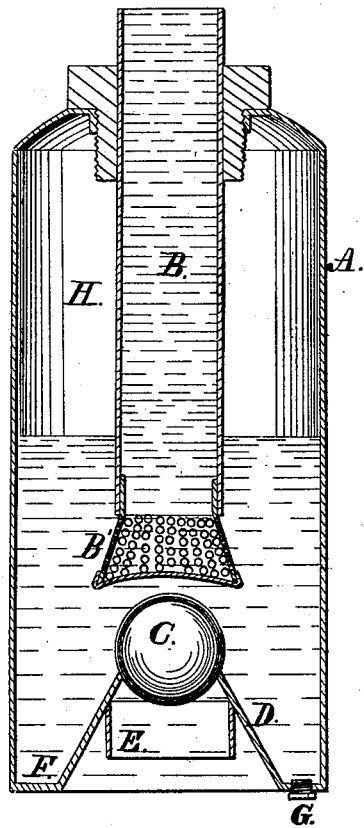

RICHARD H. HILTON, OF NEWBERN, NORTH CAROLINA, ASSIGNOR TO MITCHELL, ALLEN & CO., OF THE SAME PLACE.

Letters Patent No. 71,007, dated November 19, 1867.

IMPROVEMENT IN AIR-CHAMBERS OF PUMPS.

The Schedule referred to in these Letters Patent and making part of the same.

TO ALL WHOM IT MAY CONCERN:

Be it known that I, RICHARD H. HILTON, of Newbern, in the county of Craven, and State of North Carolina, have invented a new and improved Air-Chamber; and I do hereby declare that the following is a full, clear, and exact description thereof, which will enable others skilled in the art to make and use the same, reference being had to the accompanying drawings, forming part of this specification This invention relates to a new and improved method of constructing air-chambers for pumps and other purposes, when it is desired that a steady and uniform current of liquid or fluid should be discharged, and the invention consists in arranging a strainer and ball-valve in the chamber, and also a sand-trap or sediment-chamber, as will be hereinafter described.

The drawing represents a central vertical section of the air-chamber, showing the arrangement of parts according to my invention.

A represents the vessel or shell of the air-chamber. B is an interior tube, which is attached to the top of the chamber by an air-tight connection, as seen in the drawing. The end of the tube extends down into the chamber with a strainer, B', attached, formed of perforated metal or some other suitable material, the lower portion of which strainer is concave, as seen. C is a ball-valve, made of rubber or other suitable material, which has its seat on the top of the conical bottom of the chamber, which is marked D. E is a section of tube attached to the bottom, with which the pump is connected. F is a sand-trap or sediment-chamber which surrounds the base of the cone D. G is a screw-plug in the bottom of the sediment-chamber.

The water or other liquid being forced into the chamber through the tube E, will raise the globe-valve, and rise in the chamber until the air confined in the annular space H becomes compressed sufficiently to force the water through the strainer B', and up through the tube B into the discharge pipe. The strainer will prevent any foreign substance from entering the tube, and any sand or other foreign matter of a similar nature will be deposited in the sediment-chamber F, from whence it may be removed through the orifice at the plug G. The ball-valve, while it will rise sufficiently to admit the water, will always drop to its seat as the concave surface of the bottom of the strainer will confine and prevent it from being displaced.

Having thus described my invention, what I claim as new, and desire to secure by Letters Patent, is—

The tube B, the strainer B', ball-valve C, conical valve-seat D, and the sediment-chamber F, arranged substantially as described, in combination with the air-chamber A, for the purposes set forth.

The above specification of my invention signed by me this 26th day of August, 1867.

RICHARD H. HILTON.

Witnesses:
W. F. STANLY,
WM. B. HUTCHINSON.